US006073074A

United States Patent [19]

Saito et al.

[11] Patent Number: 6,073,074

[45] Date of Patent: Jun. 6, 2000

[54] THROTTLE CONTROLLER KEEPING CONSISTENT DEGREE OF OPENING OF THROTTLE AT MODE SWITCHING

[75] Inventors: Yoshiharu Saito; Kazutomo Sawamura; Masamitsu Fukuchi, all of Wako, Japan

[73] Assignee: Honda Giken Kogyo Kabushiki Kaisha, Tokyo, Japan

[21] Appl. No.: 09/217,079

[22] Filed: Dec. 21, 1998

[30] Foreign Application Priority Data

Dec. 22, 1997 [JP] Japan .................................... 9-353788

[51] Int. Cl.[7] ............................ B60K 41/04; F02D 41/14

[52] U.S. Cl. ............................ 701/110; 123/350; 477/111

[58] Field of Search ...................... 701/110, 54; 477/111; 123/350, 396, 399

[56] References Cited

U.S. PATENT DOCUMENTS 5,514,049 5/1996 Kamio et al. ........................... 477/111

FOREIGN PATENT DOCUMENTS 4-72444 3/1992 Japan .
7-332479 12/1995 Japan .

*Primary Examiner*—Andrew M. Dolinar
*Attorney, Agent, or Firm*—Armstrong, Westerman, Hattori, McLeland & Naughton

[57] ABSTRACT

A throttle controller having a throttle control section is provided so as to eliminate any inconsistency in the degree of opening of the throttle at the time of mode switching, and to obtain a superior driving efficiency. In the driving mode, the throttle control section calculates the degree of opening of the throttle for generating a target driving force calculated based on a plurality of parameters including the degree of depression of the accelerator, and performs a driving-force control. In the manual mode, the throttle control section performs a control for driving the engine using a degree of opening of the throttle which one-to-one-corresponds to the degree of depression of the accelerator. When the mode is switched between the driving and manual modes, the throttle control section performs switching between the two control modes if the degree of depression of the accelerator is minimum or maximum.

1 Claim, 3 Drawing Sheets

THROTTLE CONTROLLER KEEPING CONSISTENT DEGREE OF OPENING OF THROTTLE AT MODE SWITCHING

BACKGROUND OF THE INVENTION

1. Field of the Invention

The present invention relates to a throttle controller for controlling a throttle (valve) in a vehicle comprising an automatic transmission.

This application is based on Patent Application No. Hei 9-353788 filed in Japan, the contents of which are incorporated herein by reference.

2. Description of the Related Art

Generally, in conventional vehicles comprising an automatic transmission having a hydraulic torque converter, when the throttle (valve) thereof is opened in accordance with the amount of force exerted on the accelerator (pedal) while the gear lever is in a driving gear (or setting), the driving force of the engine is transmitted via the transmission system including the torque converter, clutch, and the like, to the wheels. Japanese Patent Application, First Publication, No. Hei 7-332479 discloses an example of such an automatic transmission, which comprises a lock-up clutch controller. In addition to the driving setting for activating the automatic transmission (operation), recently-developed automatic transmissions may include a holding gear (or setting) for holding the gear ratio specifically fixed.

When the gear lever is in a driving gear, the target driving force is calculated by a target driving force calculating means, based on the degree of depression of the accelerator. In order to drive the engine based on the calculated value, a throttle control section determines a target degree of opening of the throttle so as to control the throttle. In contrast, in the holding gear, the throttle is controlled in one-to-one (or unique) correspondence to the degree of depression of the accelerator.

Therefore, the degree of opening of the throttle with respect to the degree of depression of the accelerator is not consistent between the driving gear and the holding gear; thus, the driving efficiency is degraded when the gear lever is changed from the driving setting to the holding setting, or when changed from the holding setting to the driving setting.

On the other hand, recently-developed automatic transmissions may comprise a manual gear (or setting) in which a one-step down or up-shift operation can be performed by moving forward or back the gear lever. Also in this case, it is required to improve the driving efficiency when the gear lever is changed from the driving setting to the holding setting, or when changed from the holding setting to the driving setting.

SUMMARY OF THE INVENTION

In consideration of the above circumstances, an object of the present invention is to provide a throttle controller for improving the driving efficiency when switching between a manual mode such as the holding and manual settings, and the driving mode of the driving setting.

In order to realize the above object, the present invention provides a throttle controller used for a vehicle comprising an automatic transmission in which a driving mode and a manual mode are swithchable by shifting the position of a gear lever, the controller comprising:

means for detecting the degree of depression of the accelerator, and outputting a detection signal indicating a detected result; and a throttle control section,wherein:

in the driving mode, the throttle control section calculates the degree of opening of the throttle for generating a target driving force calculated based on a plurality of parameters including the actual degree of depression of the accelerator, so as to drive the vehicle by the target driving force, and performs a driving-force control for driving the engine using said degree of opening of the throttle;

in the manual mode, the throttle control section performs a control according to the accelerator for driving the engine using a degree of opening of the throttle which one-to-one-corresponds to the actual degree of depression of the accelerator, and wherein when the mode is switched between the driving mode and the manual mode, the throttle control section performs switching between the driving-force control and the control according to the accelerator if the degree of depression of the accelerator is substantially minimum or maximum, based on the detected signal from the means for detecting the degree of depression of the accelerator.

According to the above structure, when the mode is switched from the driving mode to the manual mode, or when switched from the manual mode to the driving mode, the throttle control section performs the switching operation between the driving-force control (used in the driving mode) and the control according to the accelerator (used in the manual mode) if the degree of depression of the accelerator is minimum or maximum. Therefore, it is possible to prevent the driver from having a sense of discontinuity.

That is, when the degree of depression of the accelerator is minimum or maximum, the degree of opening of the throttle has almost the same degree in both the driving-force control and the control according to the accelerator. The mode switching is performed on the above condition; thus, a superior driving efficiency can be achieved at the time of the switching.

DESCRIPTION OF THE PREFERRED EMBODIMENTS

Hereinbelow, the throttle controller according to the present invention will be explained with reference to the drawings.

Figure 1:
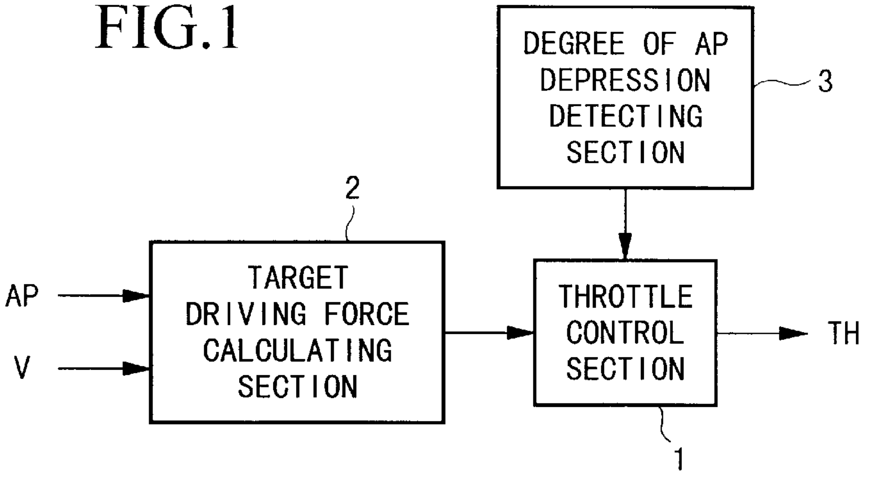
FIG. 1 is a block diagram showing the general functional structure of the throttle controller as an embodiment according to the present invention.

First, the constitution of the throttle controller will be explained with reference to FIG. 1.

In the figure, reference numeral 1 indicates a throttle control section, to which target driving force calculating section 2 is connected. This calculating section 2 calculates the target driving force (i.e., the target torque to be generated by the engine) based on a plurality of parameters including the degree of depression AP of the accelerator (pedal), and outputs a signal indicating the calculated target driving force to throttle control section 1.

The following are examples of parameters to be used: vehicle speed V, the amount of change ΔAP (per unit time) of the degree of depression of the accelerator, engine speed Ne used for considering the engine state, water temperature Tw of the engine, electrical load D, operation state (On/Off) of the air conditioner, gear position GRATIO used for considering the state of the transmission, rotational speed Nm of the input shaft of the transmission, rotational speed Nout of the output shaft of the transmission, and the gradient of the road surface. With reference to these parameters, the target driving force calculating section 2 calculates a target driving force based on the acceleration or deceleration intended by the driver, in consideration of the present engine state, the present driving state of the vehicle, the present state of the transmission, and the like.

In order to generate the target driving force, the throttle control section 1 outputs the target degree of opening TH of the throttle (that is, a command for controlling the throttle) based on the signal sent from the target driving force calculating section 2.

Section 3 for detecting the degree of depression of the accelerator (abbreviated as "degree of AP depression detecting section 3", hereinbelow) is also connected to the throttle control section 1. The degree of AP depression detecting section 3 monitors and detects the degree of depression AP of the accelerator, and outputs the detected signal to the throttle control section 1.

The throttle control section 1 controls the throttle according to the detected signal sent from the degree of AP depression detecting section 3.

In the automatic transmission in the present embodiment, regardless of whether the transmission is of a step type or a stepless type, an automatic transmission mode can be selected in which the transmission is automatically operated in accordance with the driving state of the vehicle. In a general driving mode (i.e., driving setting), the automatic transmission mode can be selected based on (i) the degree of depression AP of the accelerator and vehicle speed V in the case of the step-type transmission, or (ii) engine speed Ne, the degree of depression AP of the accelerator, and vehicle speed V in the case of the stepless-type transmission. On the other hand, in a manual mode (comprising a fixed gear such as the second-holding gear, or a gear which is normally fixed but can be shifted to one of a plurality of gear ratios according to a specific operation by the driver), a specific gear ratio can be selected and fixed by a selective operation by the driver.

Figure 2:
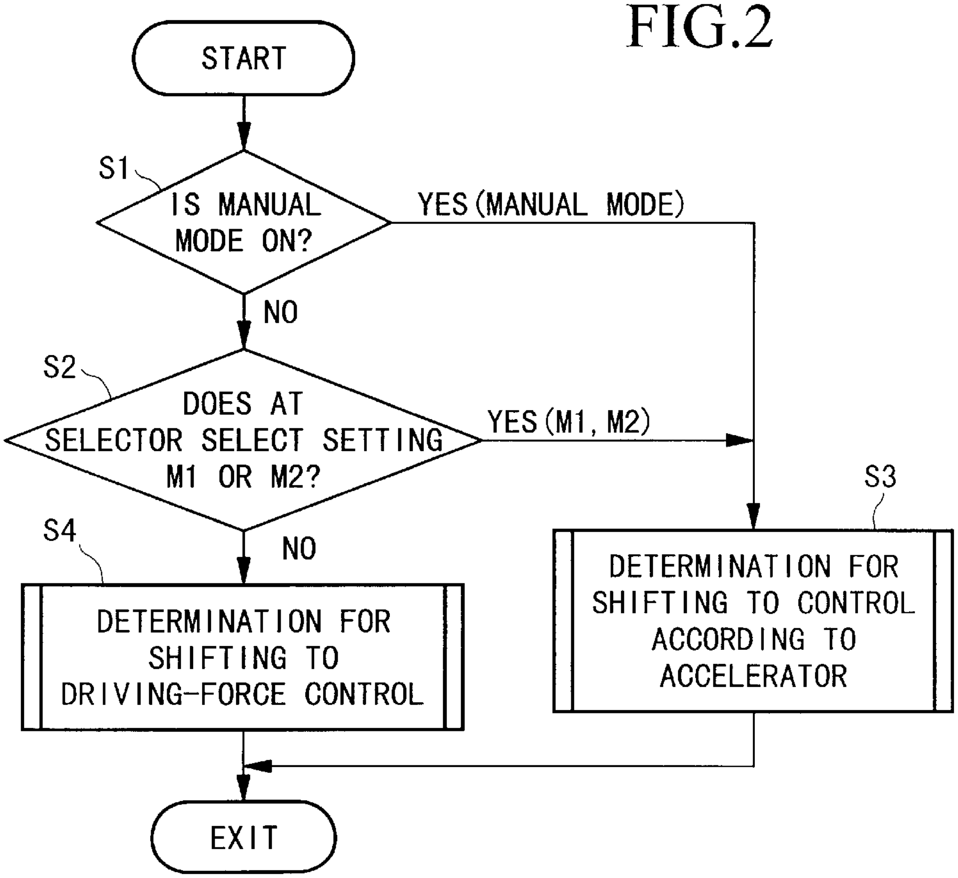
FIG. 2 is a flowchart explaining the operational flow of the switching between two control modes.
Figure 3:
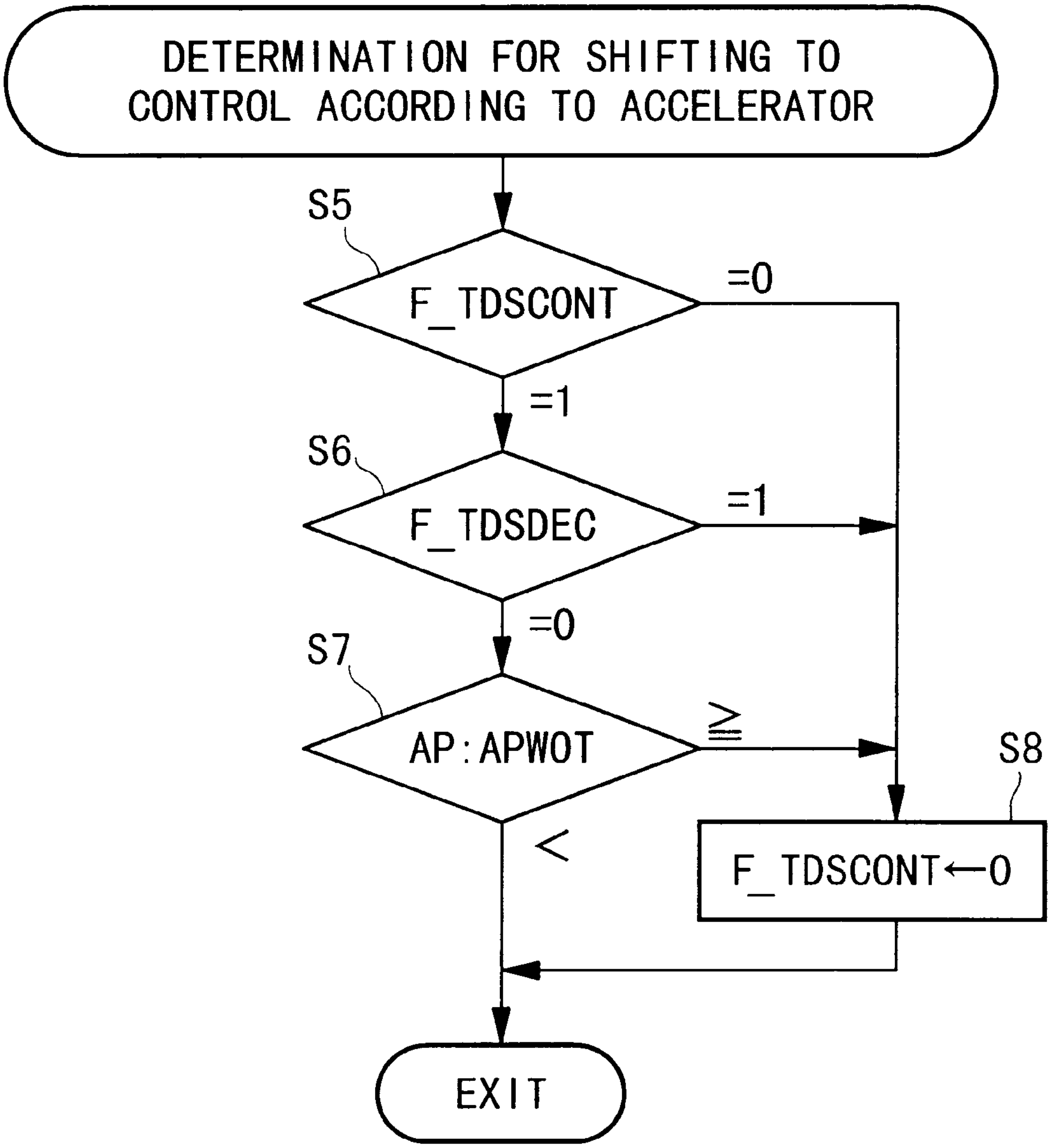
FIG. 3 is a flowchart explaining the operational flow of the determination for shifting to the control according to the accelerator.
Figure 4:
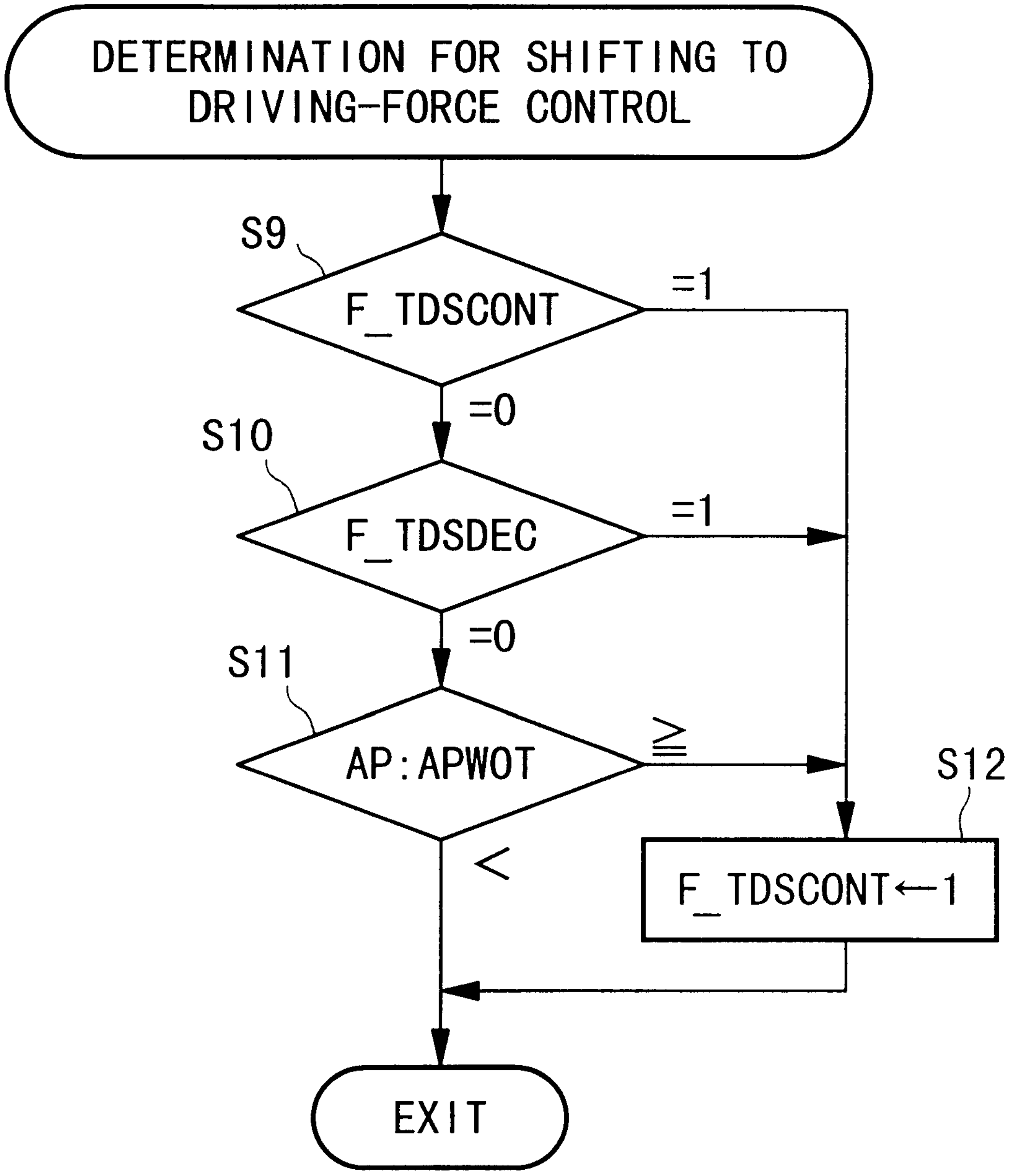
FIG. 4 is a flowchart explaining the operational flow of the determination for shifting to the driving-force control.

Hereinbelow, operations of the throttle control performed by the above throttle controller will be explained with reference to the flowcharts of FIGS. 2 to 4.

(1) When Switching from the Driving Mode to the Manual Mode

When the driver shifts the gear lever so as to change the mode from the driving mode (comprising driving setting(s)) to the manual mode (comprising a manual setting or a holding setting) (see steps S1 and S2), the throttle control section 1 starts an operation for determining whether to shift to the control according to the accelerator (see step S3). In the above step S1, it is determined whether the manual mode is selected. If the manual mode is not selected, then in the following step S2, it is determined whether the AT (automatic transmission) selector selects one of the fixed settings (M1 and M2).

(2) When Switching from the Manual Mode to the Driving Mode

When the driver shifts the gear lever so as to change the mode from the manual mode (comprising a manual setting or a holding setting) to the driving mode (comprising driving setting(s)) (see steps S1 and S2), the throttle control section 1 starts an operation for determining whether to shift to the driving-force control (see step S4).

Determination for Shifting to the Control According to the Accelerator

In step S5, it is determined whether the throttle control performed by the throttle control section 1 is in the driving-force control mode (if "yes", the driving-force control flag F_TDSCONT is 1). That is, when the throttle is controlled in accordance with the target driving force which is calculated based on vehicle speed V and the degree of depression AP of the accelerator, the operation shifts to steps S6 to S7.

The throttle control section 1 determines whether the degree of depression AP of the accelerator is minimum (in this case, flag F_TDSDEDC for indicating a deceleration throttle control is 1), based on the detected signal from the degree of AP depression detecting section 3 (see step S6). Here, the "minimum" depression may be no depression or a very small degree of depression. If the flag is 0, then the operation shifts to step S7.

In step S7, the throttle control section 1 determines whether the degree of depression AP of the accelerator is equal to or larger than the degree of depression APWOT (corresponding to the maximum depression) which is predetermined for switching the control mode. Here, the "maximum" depression may include a degree near the maximum level.

If one of the above conditions (determined by the above steps S6 and S7) is determined, then the operation shifts to step S8. In step S8, the driving-force control flag is set to 0, and the throttle control section 1 performs the control according to the accelerator, in which the degree of opening TH of the throttle, which one-to-one-corresponds to the degree of depression AP of the accelerator, is output. If neither one of the above conditions is determined, then the throttle control section 1 continues to control the degree of opening TH of the throttle in the driving-force control mode.

The above one-to-one correspondence is a relationship in which a degree of opening of the throttle is previously assigned to a degree of depression of the accelerator, and thus the degree of opening of the throttle is not changed according to parameters other than the target degree of depression of the accelerator. For example, even when the degree of depression of the accelerator is the same in the forward-driving setting (i.e., "D" gear) and the rear-driving setting (i.e., "R" gear), a specific degree of opening of the throttle is previously assigned to each setting in this one-to-one correspondence.

Determination for Shifting to the Driving-force Control

In step S9, it is determined whether the throttle control performed by the throttle control section 1 is in the control mode according to the accelerator (if "yes", the driving-force control flag F_TDSCONT is 0). That is, when the throttle is controlled while the degree of opening TH of the throttle, which one-to-one-corresponds to the degree of depression AP of the accelerator, is output, then the operation shifts to steps S10 to S11.

The throttle control section 1 determines whether the degree of depression AP of the accelerator is minimum (in this case, the flag F_TDSDEDC for indicating the deceleration throttle control is 1), based on the detected signal from the degree of AP depression detecting section 3 (see step S10). Here, the "minimum" depression may be no depression or a very small degree of depression. If the flag is 0, then the operation shifts to step S11.

In step S11, the throttle control section 1 determines whether the degree of depression AP of the accelerator is equal to or larger than the predetermined degree of depression APWOT (corresponding to the maximum depression). Here, the "maximum" depression may include a degree near the maximum level.

If one of the above conditions (determined by the above steps S10 and S11) is determined, then the operation shifts to step S12. In step S12, the driving-force control flag is set to 1, and the throttle control section 1 performs the driving-force control in which the throttle is controlled based on the target driving force which is calculated using the vehicle speed V and the degree of depression AP of the accelerator. If neither one of the above conditions is determined, then the throttle control section 1 continues to control the degree of opening TH of the throttle in the control mode according to the accelerator.

As explained above, according to the throttle controller in the present embodiment, when the mode is switched from the driving mode to the manual mode, or when switched from the manual mode to the driving mode, the throttle control section 1 performs the switching operation between the driving-force control (used in the driving mode) and the control according to the accelerator (used in the manual mode) if the degree of depression of the accelerator is minimum or maximum. Therefore, it is possible to prevent the driver from having a sense of discontinuity.

That is, if the degree of depression of the accelerator is minimum or maximum, the degree of opening of the throttle has almost the same degree in both the driving-force control and the control according to the accelerator. The mode switching is performed in the above condition; thus, a superior driving efficiency can be achieved at the time of the switching.

In the above embodiment, the switching operation between the driving-force control and the control according to the accelerator is performed by the throttle control section 1 when the degree of depression AP of the accelerator is minimum or maximum. However, the timing for performing this control-mode switching operation is such that it may be performed only when the degree of depression AP of the accelerator is minimum, or only when the degree of depression AP of the accelerator is maximum.

What is claimed is:

1. A throttle controller used for a vehicle comprising an automatic transmission in which a driving mode and a manual mode are swithchable by shifting the position of a gear lever, the controller comprising:

means for detecting the degree of depression of the accelerator, and outputting a detection signal indicating a detected result; and a throttle control section, wherein:

in the driving mode, the throttle control section calculates a degree of opening of the throttle for generating a target driving force calculated based on a plurality of parameters including the actual degree of depression of the accelerator, so as to drive the vehicle by the target driving force, and performs a driving-force control for driving the engine using said degree of opening of the throttle;

in the manual mode, the throttle control section performs a control according to the accelerator for driving the engine using a degree of opening of the throttle which one-to-one-corresponds to the actual degree of depression of the accelerator, and wherein when the mode is switched between the driving mode and the manual mode, the throttle control section performs switching between the driving-force control and the control according to the accelerator if the degree of depression of the accelerator is substantially minimum or maximum, based on the detected signal from the means for detecting the degree of depression of the accelerator.

* * * * *